United States Patent
McGill

(10) Patent No.: US 7,165,699 B2
(45) Date of Patent: Jan. 23, 2007

(54) DISPENSING DEVICE

(75) Inventor: Shane Robert McGill, West Maling (GB)

(73) Assignee: McGill Technology Limited, Kent (GB)

(*) Notice: Subject to any disclaimer, the term of this patent is extended or adjusted under 35 U.S.C. 154(b) by 295 days.

(21) Appl. No.: 10/475,637

(22) PCT Filed: Apr. 23, 2002

(86) PCT No.: PCT/GB02/01932

§ 371 (c)(1),
(2), (4) Date: Oct. 20, 2003

(87) PCT Pub. No.: WO02/085776

PCT Pub. Date: Oct. 31, 2002

(65) Prior Publication Data

US 2004/0118878 A1 Jun. 24, 2004

(30) Foreign Application Priority Data

Apr. 23, 2001 (GB) .................................. 0109940.7

(51) Int. Cl.
*B67D 5/06* (2006.01)

(52) U.S. Cl. .................... 222/63; 222/66; 222/153.13; 222/181.2; 222/386

(58) Field of Classification Search ................ 222/59, 222/63, 66, 153.13, 181.1, 181.2, 386
See application file for complete search history.

(56) References Cited

U.S. PATENT DOCUMENTS

| 4,389,001 | A | * | 6/1983 | Franklin .................... 222/63 |
| 4,790,456 | A | * | 12/1988 | Nakane et al. ............. 222/183 |
| 5,464,120 | A | * | 11/1995 | Alpers et al. .................. 222/1 |
| 5,915,593 | A | * | 6/1999 | Bancon ....................... 222/41 |
| 5,918,767 | A | | 7/1999 | McGill |
| 6,319,532 | B1 | * | 11/2001 | Pineault ..................... 426/516 |
| 2003/0160073 | A1 | * | 8/2003 | Gispert Casino et al. ... 222/386 |

FOREIGN PATENT DOCUMENTS

| WO | WO 97 42096 | 11/1997 |
| WO | WO 01 60173 | 8/2001 |

* cited by examiner

Primary Examiner—Joseph A. Kaufman
(74) Attorney, Agent, or Firm—Kilpatrick Stockton LLP

(57) ABSTRACT

The invention has application to dispensing dessert products from pre-filled containers. The container (11) has an outlet (12A) and a moveable portion (13) which is engageable to reduce the container internal volume and cause product to be extruded from an outlet. The container is located on a support (15) during dispensing and there are elements (48–51, 53) for detecting whether the product is extrudable and/or whether dispensing is complete. In addition, there is a detector (35–37) for detecting a container in a discharge position on the support.

8 Claims, 10 Drawing Sheets

DISPENSING DEVICE

FIELD OF THE INVENTION

This invention concerns dispensing means, in particular means for dispensing food product from pre-filled containers.

BACKGROUND

There has been described in WO94/13154, WO96/01224 and in International patent application PCT/GB01/00450 method and apparatus for dispensing product from pre-filled containers. Such method and apparatus is primarily intended to dispense semi-solid food product, such as ice cream, from pre-filled containers of such product by moving a portion of the container to reduce the internal volume thereof and extrude product from an outlet in the container.

SUMMARY OF THE INVENTION

The present invention has as an object to provide improved apparatus and method for use in dispensing product.

According to the invention there is provided apparatus for dispensing product from pre-filled containers comprising a product container having an outlet, a moveable portion of the container moveable to reduce the container volume and cause product to be extruded from the outlet, the container being locatable on a support, the apparatus further comprising drive means for engaging said moveable portion to effect discharge of product from container, and the drive means including detecting means for detecting whether is product is dischargeable from the container, the drive means including a plunger engageable with the moveable portion of the container, the drive means extending between a fixed member and the container during use, and the detecting means detecting pressure applied by the plunger on the container, whereby, if said pressure exceeds a predetermined value, the drive means is operated to cease an operational drive movement.

Preferably the detecting means comprises resilient means moveable upon a predetermined pressure being applied thereto and the detecting means being associated with switch means, whereby upon movement of the resilient means, the switch means is actuated to cause the drive means to cease operational movement thereof.

Preferably the resilient means is in the form of spring means arranged such that when the pressure applied thereto exceeds a predetermined level, the spring means contracts and permits the body of the drive means to move to actuate the switch means.

According to another aspect of the invention apparatus for dispensing product from pre-filled containers comprises a product container having an outlet, a movable portion of the container whereby to reduce the container volume and cause product to be extruded from the outlet, the container being locatable on a support, the apparatus comprising drive means for engaging said moveable portion to effect discharge of product from the container, and detection means for detecting a container is present on said support, the detection means including a member moveable to engage the container and thereby detect its presence on the support, said member being urged towards said support whereby to remain in a predetermined position relative thereto during operation of the detection means.

According to another aspect, the invention provides apparatus for dispensing product from pre-filled containers which comprises a product container having an outlet, a moveable portion of the container whereby to reduce the container volume and cause product to be extruded from the outlet, the container being locatable on a support, the apparatus further comprising drive means for engaging said moveable portion to effect discharge of product from the container, and the support being moveable between a charging position of the container and a container discharge position, locking means for securing the support in the discharge position, the locking means operating when it is detected that the support is in the discharge position. Preferably the locking means includes an electrically actuated bolt means or a mechanically operated latching arrangement.

According to a still further aspect the invention provides apparatus for dispensing product from pre-filled containers which comprises a product container having an outlet, a moveable portion of the container moveable to reduce the container volume and cause product to be extruded from the outlet, the container being locatable on a support, the apparatus including a plunger for engaging said moveable portion to effect discharge of product from the container the plunger being reciprocally moveable between empty and full positions and in order to permit cleaning of the plunger it is selectively moveable beyond the empty and/or full positions.

Further features of the invention will appear from the following description of an embodiment of the invention given by way of example only and with reference to the drawings, in which:

DETAILED DESCRIPTION OF THE DISCLOSED EMBODIMENTS

Figure 1:
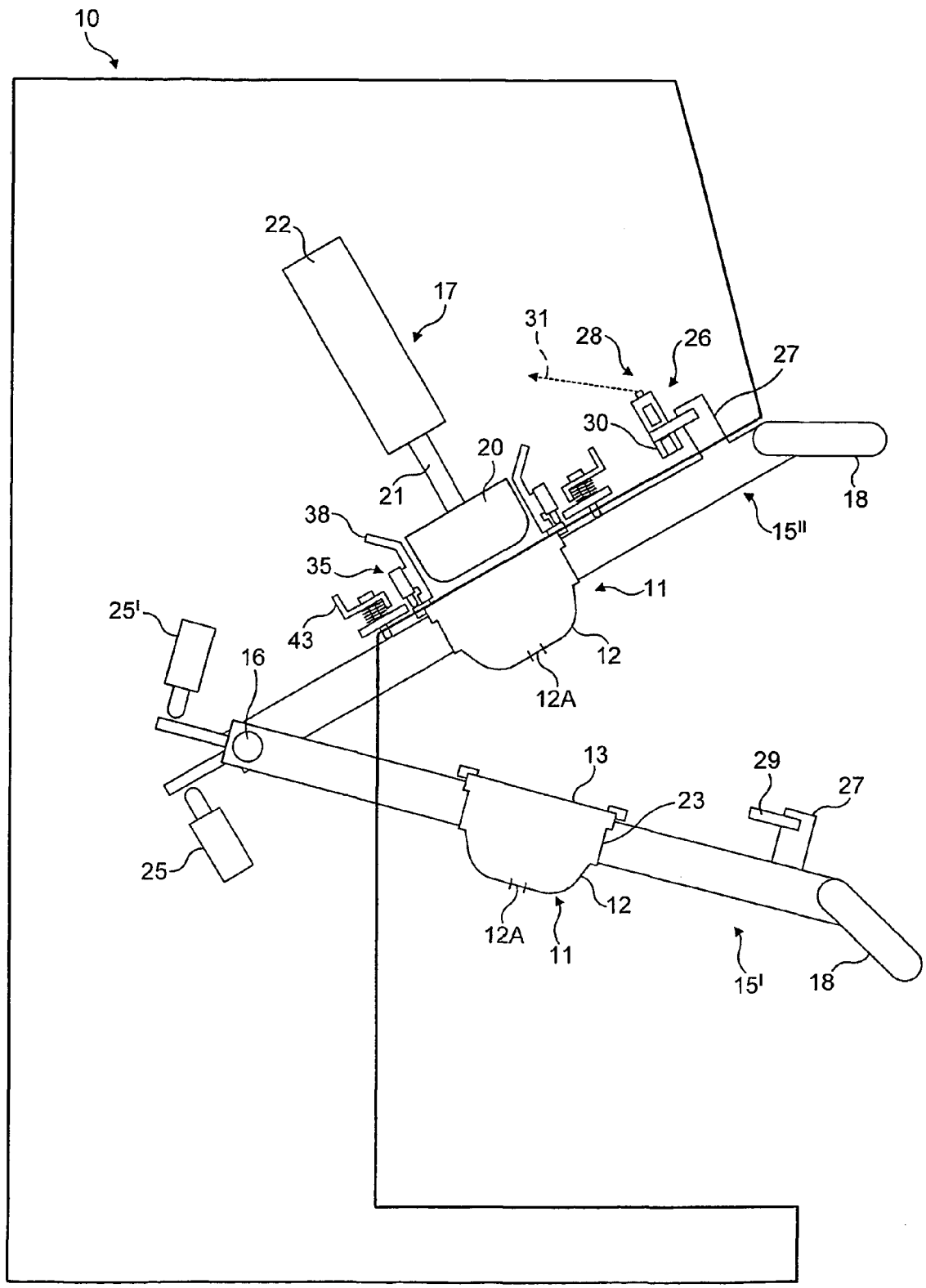
FIG. 1 is a schematic side elevation of dispensing apparatus.

Referring to the drawings there is shown dispensing apparatus which is intended to dispense food product from pre-filled containers.

The apparatus is in many respects similar to that described in WO94/13154, WO96/01224 and in International patent application PCT/GB01/00450 and reference should be made to the disclosures in these earlier applications for fuller details of the apparatus.

The apparatus includes a frame and housing assembly 10 with a seating 23 on which individual pre-filled containers 11 are located and from which containers food product, such as ice cream, is dispensed into receptacles (not shown) which may be a conventional cone or dish.

In the illustrated apparatus the container 11 is formed of a base portion 12 having an outlet 12A and a closure member 13 which is located onto the base 12 after the container is filled with product. The closure member 13 is generally of circular shape and has a central region which is deformable towards the base 12 whereby to reduce the internal volume of the container 11 and cause the contents to be discharged through the outlet 12A by extrusion, in known manner. Usually the container 11 will be discharged of its contents in one dispensing operation to provide a portion of product of the size required for consumption.

Containers 11 are locatable on an arm 15 carried on the apparatus for pivoting about an axis 16 to a position 15' in which the arm 15 is lowered. In this position a full container 11 may be located on the arm 15 and, after discharge of its contents, the container 11 may be removed from the arm 15. In a position 15" the container is in a position for its contents to be discharged by operation of drive means 17 by which the central portion of the closure 13 is deformed towards the base 13. In the position 15" the arm 15 is elevated from the position 15' about the pivot 16 so that the arm extends upwardly from the pivot 16 at an angle to the horizontal. Movement of the arm 15 between the positions 15' and 15" is assisted by a handle 18 located at the outer end of the arm 15.

The drive means 17 includes a plunger having a plunger head 20 mounted on a rod 21 which is reciprocally moveable by a linear drive arrangement 22 by which a rotary movement of an electric motor is converted into a linear movement of the head 20 and the rod 21. Thus when it is required to discharge a container 11 the head 20 engages the closure 13 to deform the closure towards the base 12 and cause product to be extruded from the container outlet 12A. In moving towards the container the head passes through a spring loaded shroud 38 which is outwardly flared at its upper end to assist in preventing contamination of switches in that region due to for example cleaning materials. The shroud 38 engages the edges of the closure member 13 to ensure that it is fully located on the base 12 during a dispensing operation. The plunger head 20 in engaging the container also serves to secure the closure member 13 on the base.

The container 11 is located on the arm 15 within a seating 23 provided by the arm 15 and shaped according to the external profile of the container 11. The seating 23 is arranged to receive the container 11 and firmly support it during discharge but the container is readily releasable from the seating when the arm 15 is in the lowered position 15'. The seating 23 has an opening corresponding to the position of the container outlet 12A and sized to permit product to pass through without product contacting the opening.

When the arm 15 is in the discharge position 15" it needs to be firmly secured in this position for operation of the drive means 17. A position detector 25 is located to be engaged by the arm 15 or a portion thereof when it has reached the uppermost discharge position 15". A further detector 25' is shown for detecting when the arm 15 is in position 15', the container changing position, but the detector 25' can be omitted. The detector 25, when operated to show the arm is in position 15", transmits a signal to a locking device 26 to tell the locking device 26 to secure the arm 15 in position 15".

The locking device includes an upstanding locking member 27 located towards the outer end of the arm 15. The locking member 27 co-operates with another locking member 28 mounted on the apparatus 10. A plate 29 is formed on the member 27 and when the arm reaches the dispensing position 15" a pin 30 on the member 28 latches into engagement with an opening in the plate 29 to firmly secure the arm 15 in position 15". When the container contents have been discharged by the discharge means 17 the pin 30 is released by tensioning a cable 31 which permits the arm to move down to the position 15'. Such movement downwards is usually under gravity but to prevent an abrupt movement a gas spring, suspension spring or gears is provided to cushion said movement downwards.

In order to assist in securing the arm 15 in a dispensing position the plunger 17 may be arranged to lift the shroud 38 upwards and lifting the arm upwards to lock it in position when the plunger is retracted upwards. When the arm is fixed in position the shroud moves downwards to engage the closure member 13.

The pin 30 is moved between a locking and release position by the cable 31 or the like connected to a motor or solenoid whereby the cable 31 is tensioned to pull the pin or release the pin between unlocked or locked positions respectively, the pin normally being urged towards a locking position.

Instead of a mechanically-operated latching arrangement there may be an electrically operated bolt which is operated when detector 25 is operated.

The arm 15 is preferably made from cast aluminium or a plastics moulding in which the seating 23 for the containers 11 is formed. Instead of the detector 25 being positioned as shown the detector 25 may be located towards the outer end of the arm 15 so that the settings of the detector will be less critical. The arm may have the facility for different seatings to be fitted to accommodate different sized containers in the seatings for a range of container sizes and capacities.

Figure 2A:
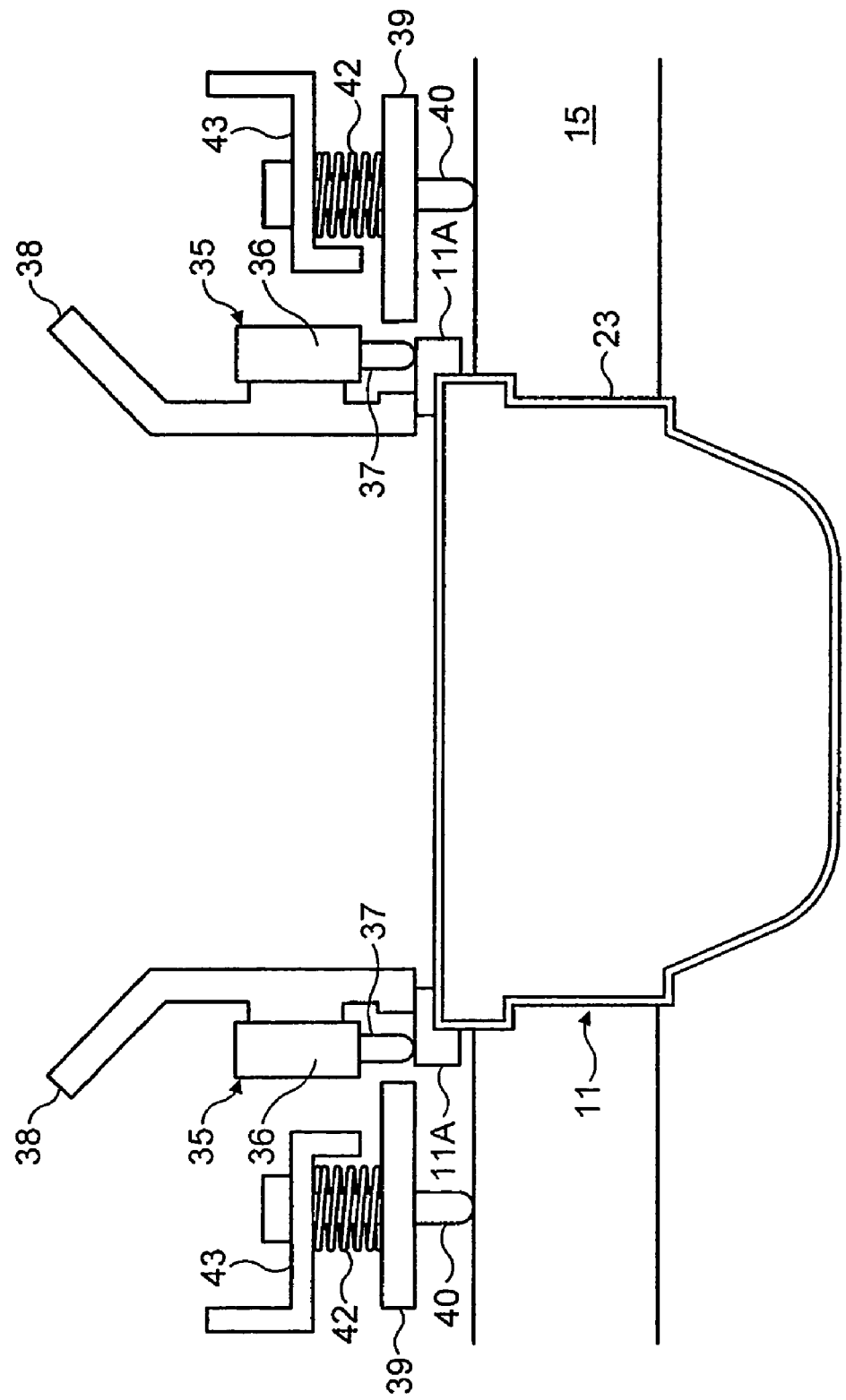
FIG. 2A is a schematic cross-section of part of the apparatus showing container position detection means.
Figure 2B:
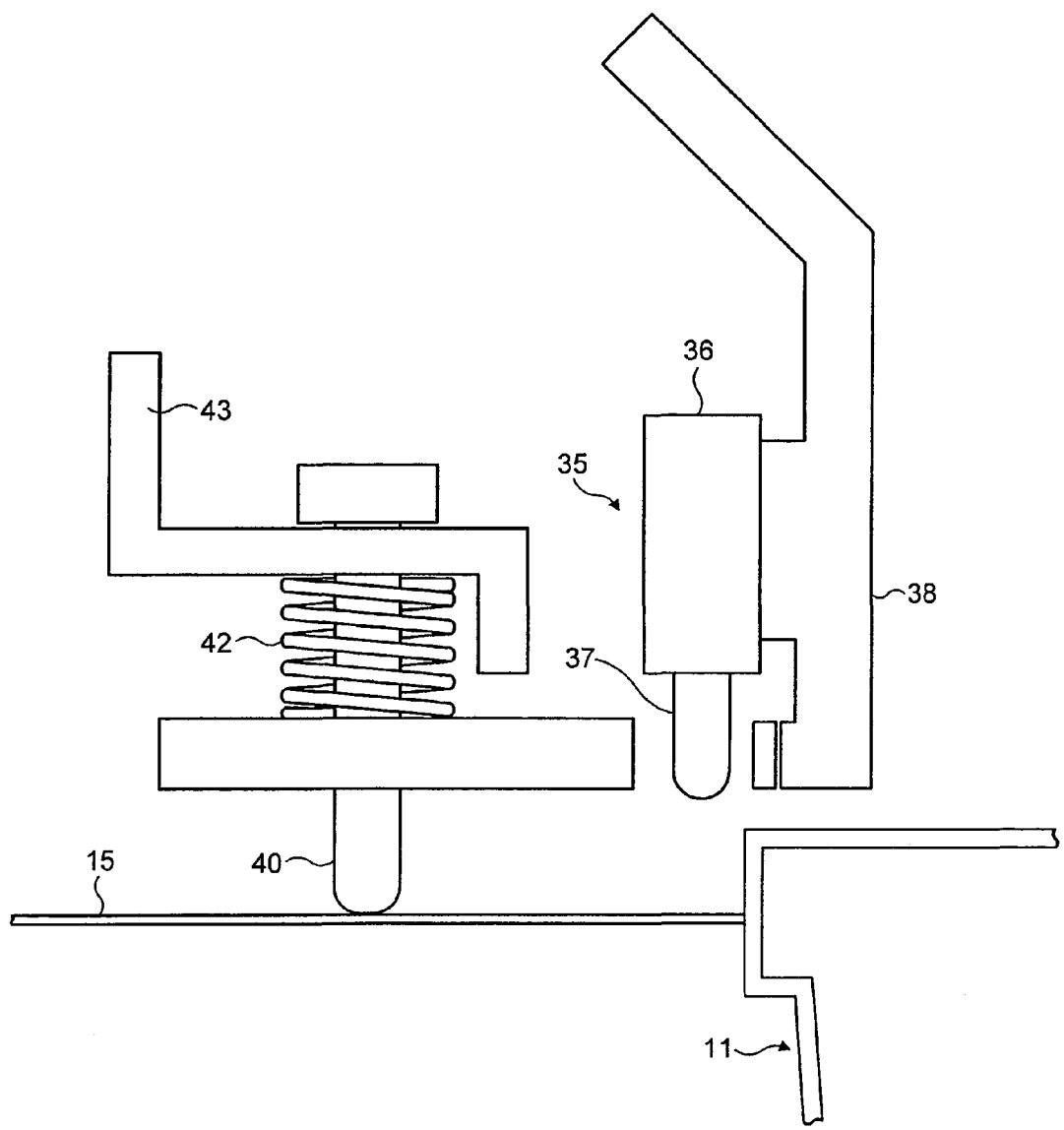
FIGS. 2B and 2C show part of the detection means in positions indicating no container and container present positions respectively.
Figure 2C:
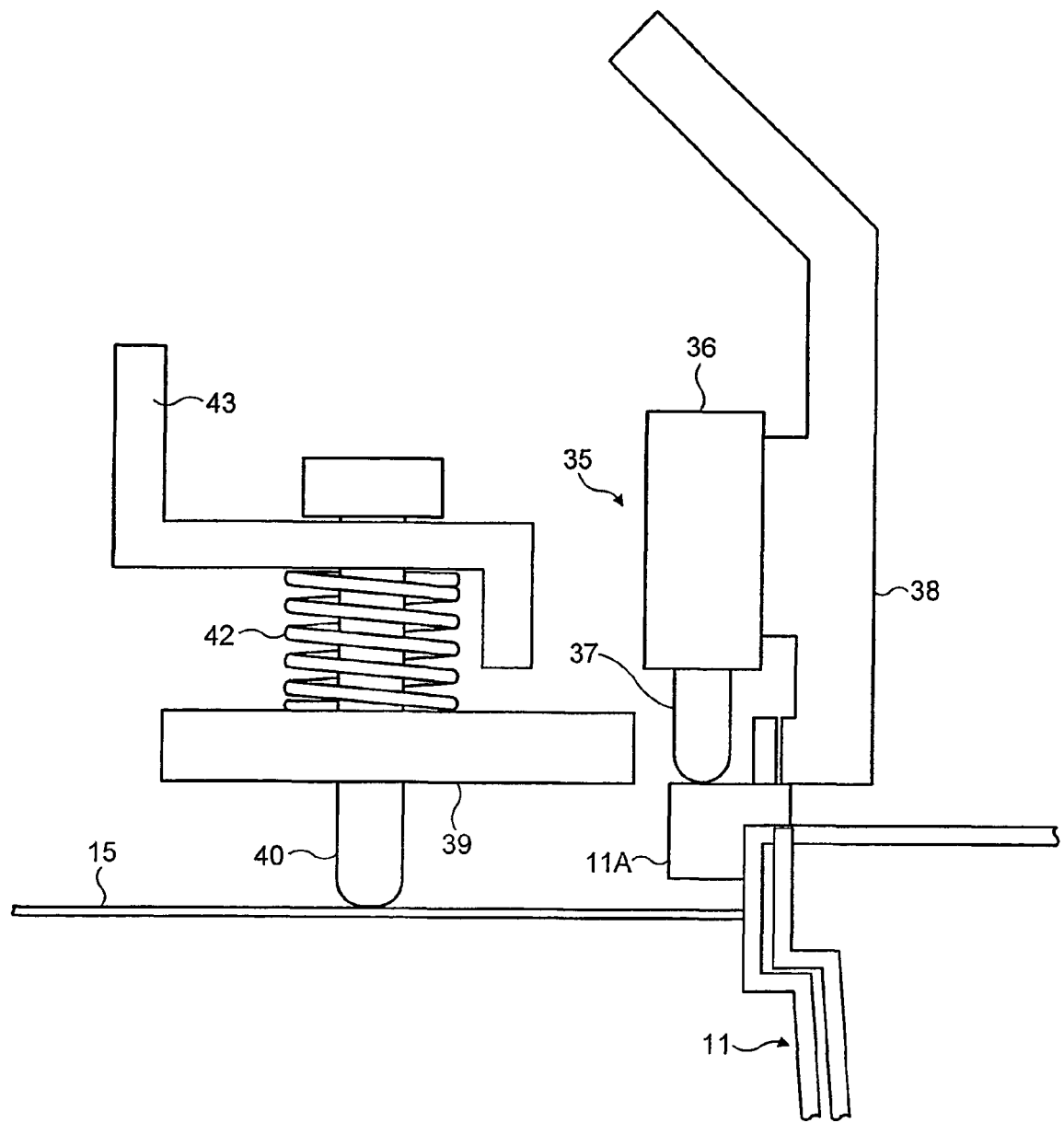

Referring now particularly to FIGS. 2A, 2B and 2C there is shown an arrangement for detecting the presence or absence of a container 11 on the arm 15 when the arm is moved to position 15" for a dispensing operation. The arrangement includes container detection switches 35 positioned at opposite sides of the container seating 23. The switches 35 each have a body 36 and a moveable member 37 which moves relative to the body on contacting a container 11. In FIG. 2B when a container is not present the moveable member 37 is not moved due to the absence of the container and the operative end of the moveable member 37 is in close proximity with the area of the arm surrounding the seating 23. In FIG. 2C the moveable member 37 contacts the upstanding rim portion 11A of a container 11 and is moved relative to the body 36 to indicate the presence of a container in the seating 23. At the same time the member 37 is urged downwards onto the rim 11A to assist in locating the rim on the container if necessary. If however the rim is still not in a precise location, the floating construction of the switch support enables the switches to determine whether a container is in place in the seating.

Each detector switch 35 is mounted through a bracket or collar 38, which also acts as a shroud, on an integral supporting member 39 which is resiliently urged downwards so that feet 40 of the member 39 are urged into contact with the upper surface of the arm 15. This is achieved by spring members 42 which are urged downwards under spring force at their lower ends and, at the upper ends, are mounted fixedly on the frame of the apparatus through arms 43. The lower end of the bracket or shroud 38 acts on the top of the container, when present.

This arrangement overcomes any flexing of the arm 15 which takes place during a dispensing operation. Thus when the arm is deflected under the action of the dispensing force the detector switches 35 remain in the same position relative to the arm as when no deflection is taking place. In effect the switches 35 float and always maintain the same position relative to the arm 15.

Figures 3A, 3B:
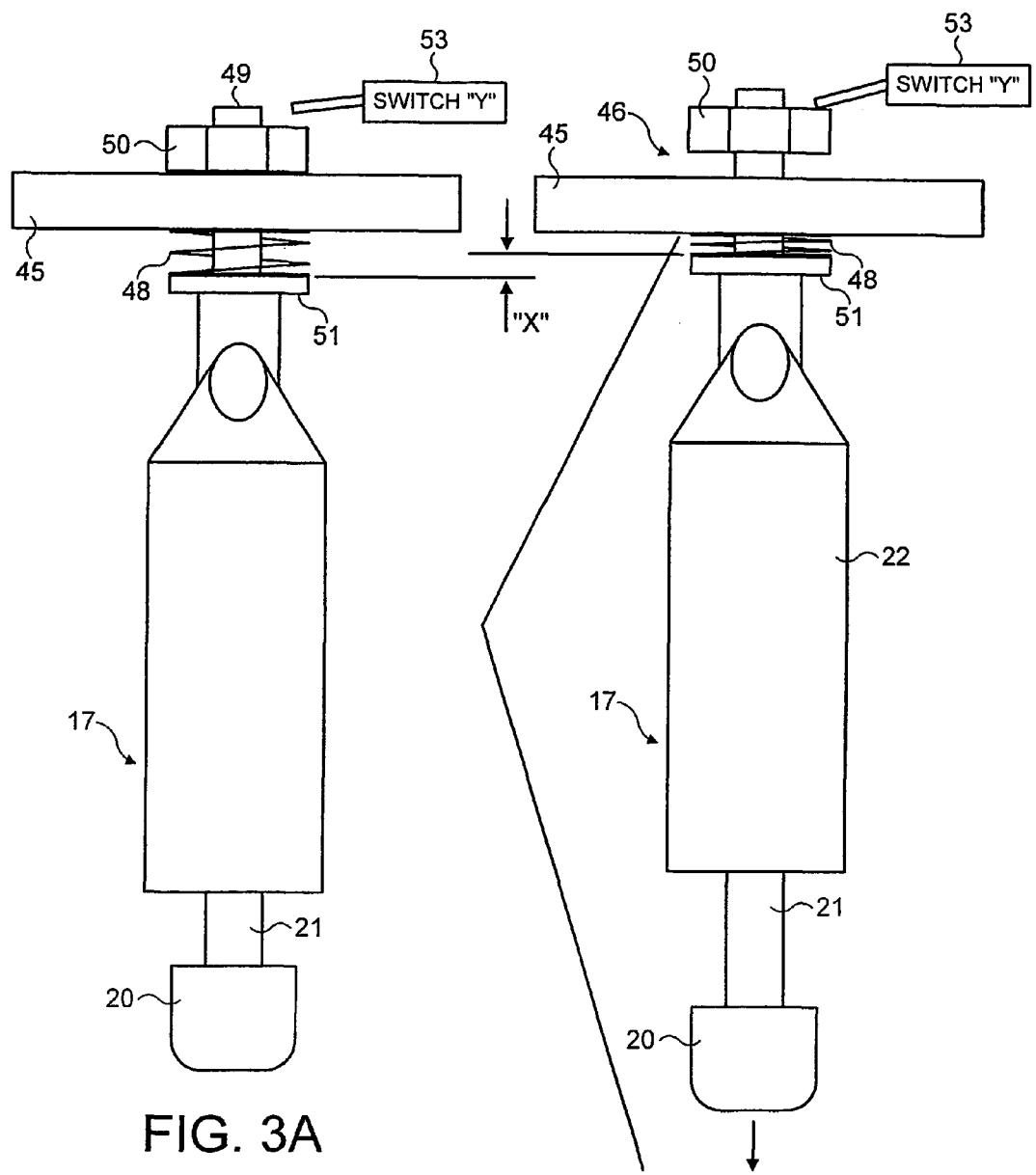
FIGS. 3A and 3B show the apparatus drive means in two positions, an initial position with the drive means ready for use and a position in which the drive means detects that product cannot be dispensed, respectively.

Referring now to FIGS. 3A and 3B there is shown a plunger 20, 21 and plunger drive 22, usually in the form of a linear drive, which is adapted to detect by mechanical means whether the pressure exerted by the drive exceeds predetermined limited amount. The drive 17 is attached to a rigid frame portion 45 of the apparatus through a connection 46 permitting the drive 17 to move in its axial direction under the restraint of spring means 48 preferably comprising a disc spring or springs of the kind known as belleville springs. The springs 48 are located around a rod 49 on one end of which is located a fixed nut 50, the other end carrying a flanged member 51 and being secured to the upper end of the drive means 17.

FIG. 3A shows the drive arrangement 17 in a position ready to exert a discharge action on the container 11. In this position the head 20 is in its retracted position together with the rod 21, and the springs 48 are in their extended condition so that the flange 51 is spaced from the frame 45 with the fixed nut 50 engaging with the upper side of the frame.

In FIG. 3B the drive means has encountered a resistance greater than the predetermined resistance after the plunger 20 has begun a discharge operation and is extended from the drive means. The disc springs 48 become compressed and are subject to a sudden reduction in axial length as shown and the member 51 moves closer to the frame 45 with the nut 50 moving away form the frame 45 to engage a switch 53 which signals that the drive means has exerted the predetermined higher force. This indicates that the product within the container is too hard to be discharged and alerts the operator of this condition. In dispensing frozen ice cream this condition can arise when the product is insufficiently tempered prior to the container being placed on the apparatus. It will be appreciated that the disc springs 48 can be selected to be used alone, in pairs, or in other multiples to achieve the desired deflection. In addition operation of the switch 53 indicates that a dispensing operation is complete, the container having been emptied. After the pressure applied to the springs 48 is released, the springs resume their initial axial length. It will be appreciated that the plunger drive is able to exert a greater force on the container than is necessary for dispensing product. The use of the belleville spring arrangement depends on this for its operation in detecting too hard product and/or empty container.

Figure 4A:
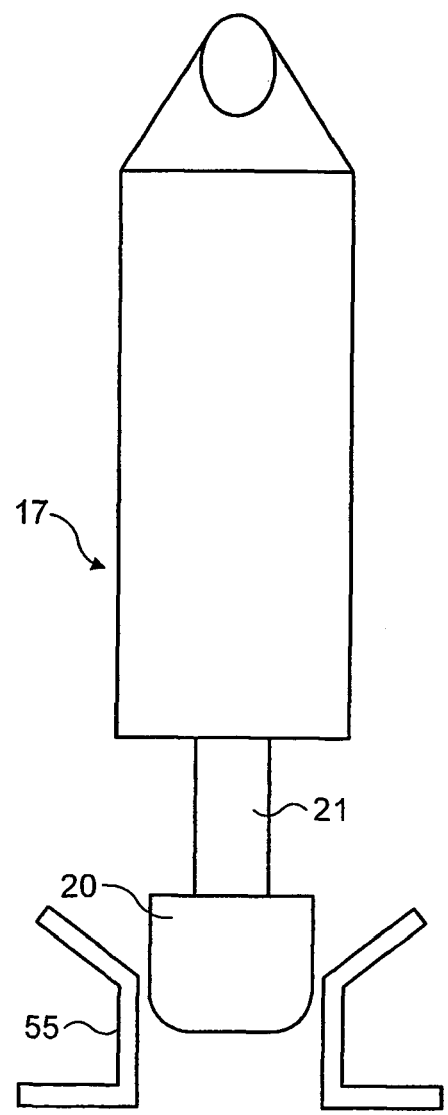
FIGS. 4A, 4B and 4C show the drive means in three positions, illustrating cleaning positions of the drive components.
Figure 4A:
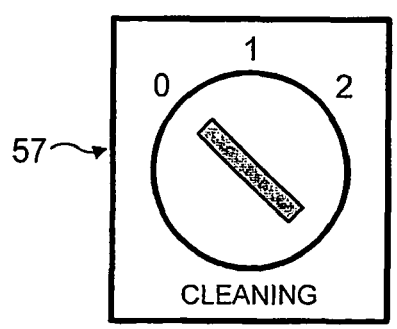
Figure 4B:
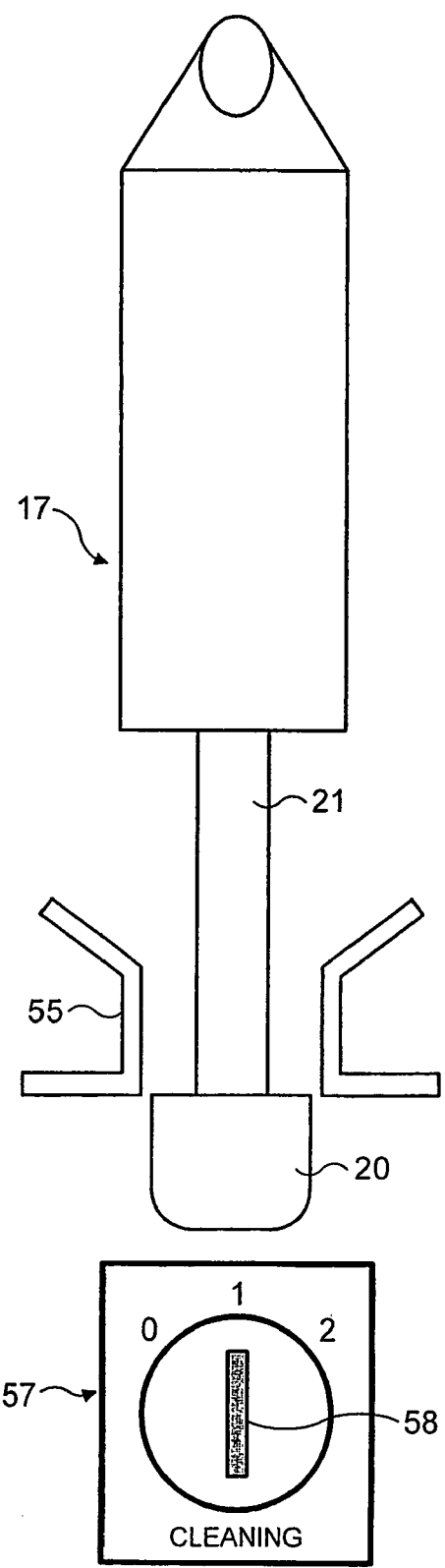
Figure 4C:
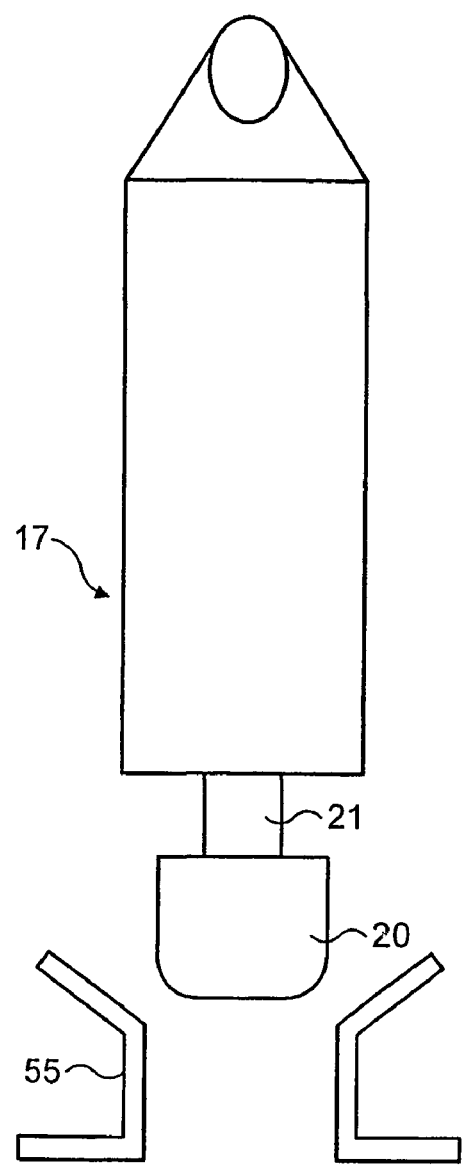
Figure 4C:
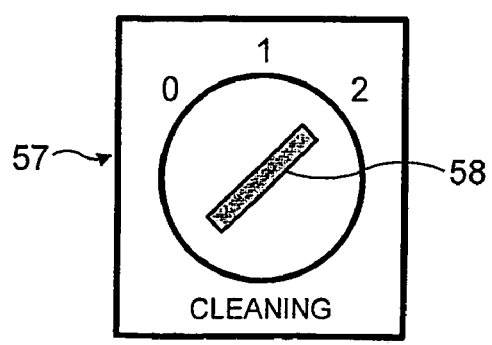

Referring now to FIGS. 4A, 4B and 4C there is provided an arrangement whereby the plunger head 20 and surrounding equipment may be more readily cleaned in the event that this is necessary. The plunger head 20 is normally arranged to pass through a collar 55 during its passage towards the container 11 which is located below the collar 55. In FIG. 4A the plunger 25 is in its normal, ready to operate position prior to a discharge operation. In this position the head 20 is somewhat obscured by the collar 55 so is difficult to clean. Similarly the internal surfaces of the collar 55 are obscured.

As seen in FIG. 4B, provision is made for the head 20 to be extended beyond its normal container discharge position so that the head protrudes below the collar 55 and is exposed for cleaning, to ensure there is no access for fingers to become trapped. In addition the plunger head 20 may be removable in this position for cleaning.

In FIG. 4C it will be seen that the head 20 is retractable rearwardly of the position of FIG. 4A so that the collar 55 is accessible for cleaning its internal surfaces.

It will be appreciated that the positions of FIG. 4B and FIG. 4C are selected solely during a cleaning operation and the controls are arranged so that movement to the positions of FIG. 4B and FIG. 4C are not selected inadvertently by the operator. A rotary switch 57, shown in the lower parts of FIGS. 4A, 4B and 4C, provide one arrangement for the cleaning cycles and switch 57 is arranged to be operated by a key locatable in the key slot 58.

Control of the cleaning operation is arranged so that after the head 20 is retracted upwards to the position of FIG. 4C (position 2) movement to position O—'ready to dispense' or to position 1—'ready to clean head 20' cannot be achieved until after the arm 15 has been returned to its dispense position. This arrangement is for safety reasons.

The apparatus shown and described may instead of having manual operation of the arm 15 utilise a powered movement using a low torque drive. Moreover there may be provided a detector, such as a photocell, whereby it is detected whether the operator or other obstruction is present to prevent operation.

In some arrangements the arm 15 may be released automatically after dispensing is completed, either immediately after or after a predetermined delay period. In any event the receptacle into which the product has been dispensed should be clear of the arm when release takes place. The apparatus may be fitted with user aids whereby the user will be given instructions, incorporated into the apparatus, visually and/or audibly concerning the next step to be taken in the operating cycle and also information should there be a fault in the apparatus, or an error in the operation of the apparatus.

Figure 5:
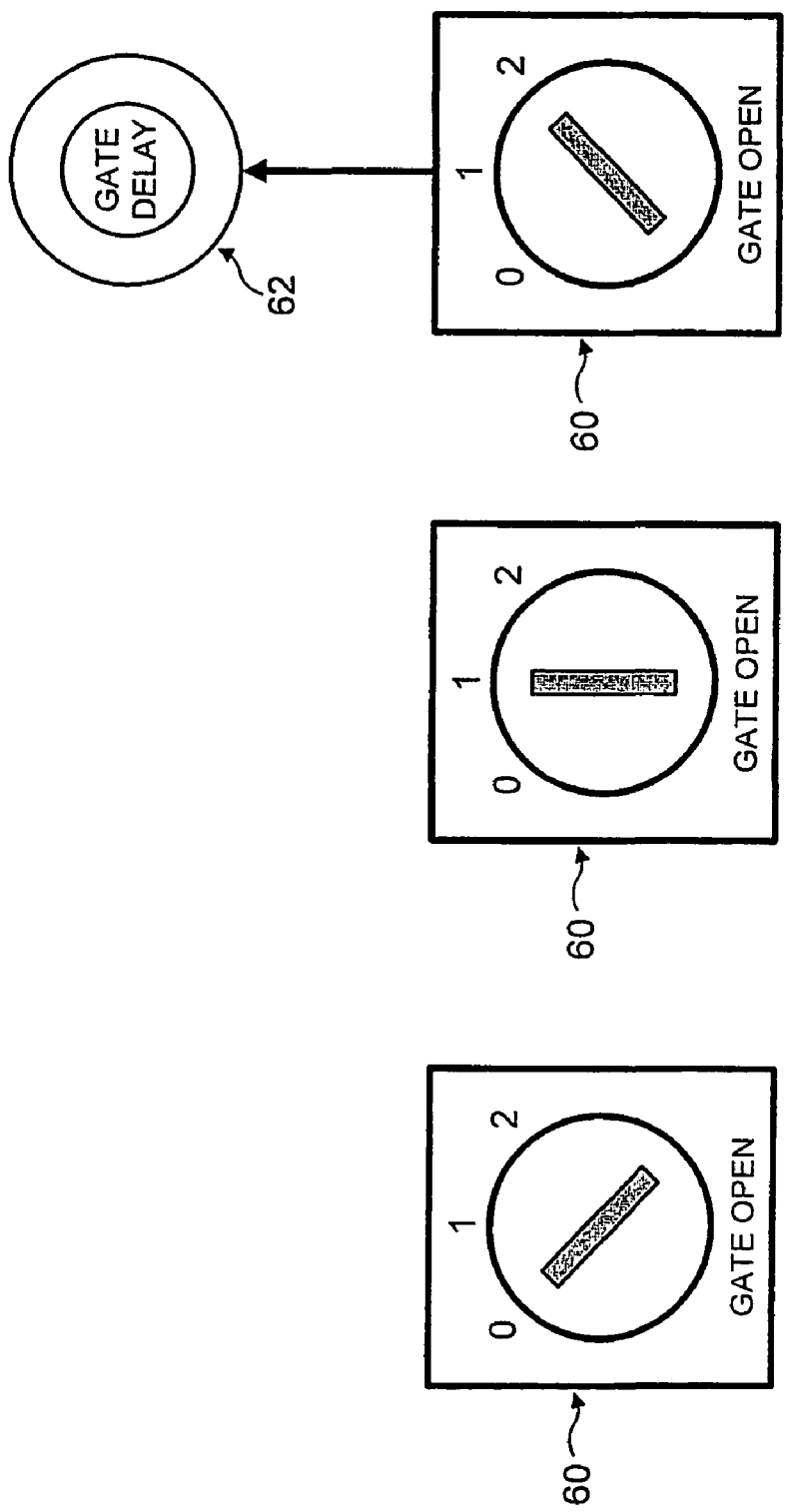
FIG. 5 shows three positions of a control for container release.

Referring to FIG. 5 there is shown a control arrangement for controlling release of the arm 15. A control switch 60 is provided having three positions marked 'O', '1' and '2'. According to the position of the switch the arm 15 is released differently such that at position 'O' the arm 15 is only releasable by manual operation of the arm release switch. At position '1' the arm is released automatically when a container has been fully discharged and the plunger 20 is retracted fully. At position '2' the arm is released after a pre-set time has elapsed following full retraction of the plunger 20. The pre-set time is adjustable by an adjustable delay device 62.

Figure 6:
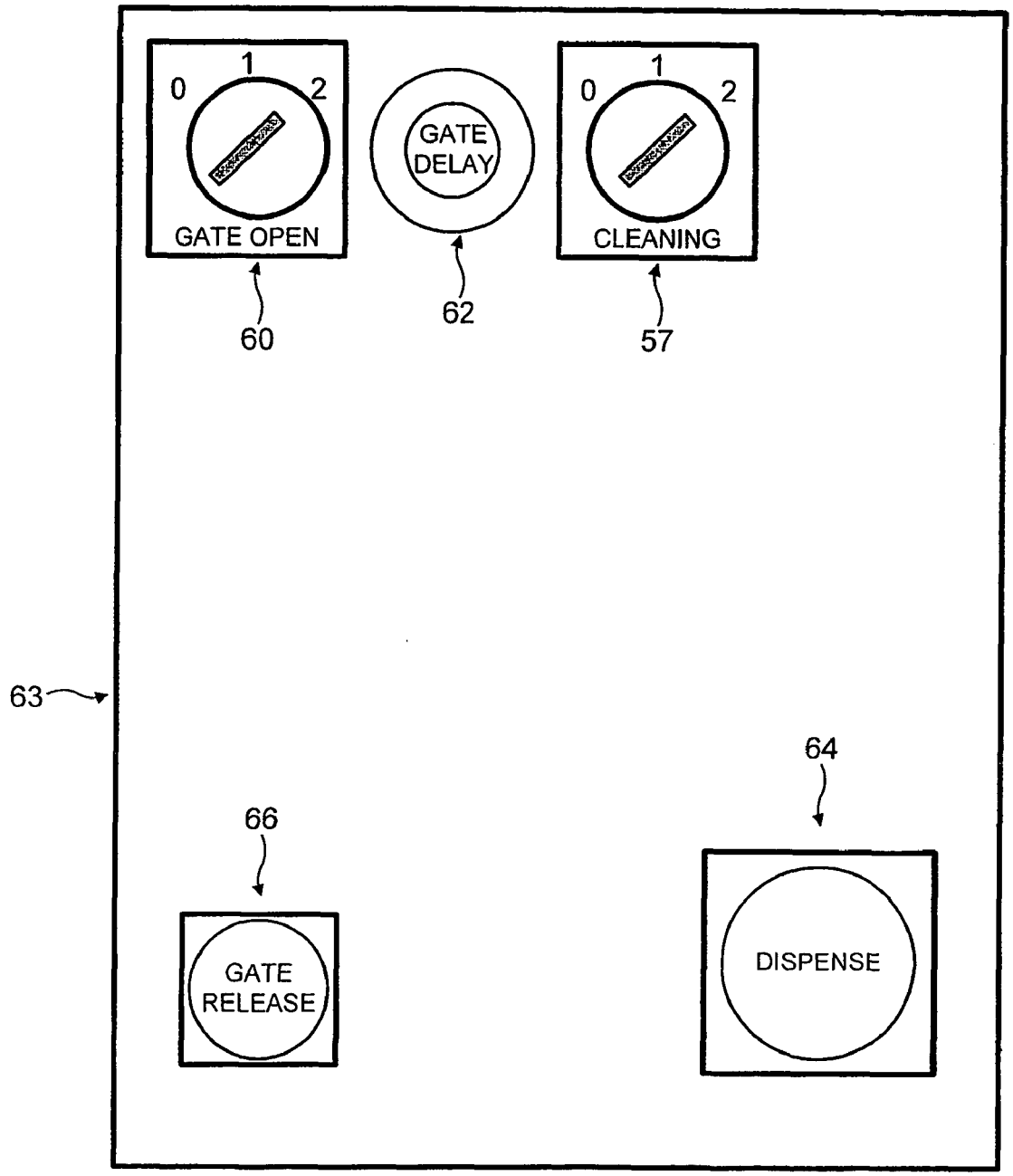
FIG. 6 shows a control panel for the apparatus.

Referring to FIG. 6, there is shown a typical control panel 63 for the apparatus incorporating the switch 60 and delay device 62, the switch 57, 58 for effecting the cleaning cycle, a control button 64 for the effecting the start of the dispensing operation, and a release button 66 for releasing the arm 15 or gate manually after dispensing is complete. The control panel may also include other signal indicators including audio indicators for telling the operators about any operational faults or advising the operator of the operation state of the apparatus.

In order to monitor the operation of the apparatus various operational parameters can be detected such as the member of operating cycles, including cycles where operation failed, for example, due to product being too hard. In addition failed cycles are detectable together with cycles when full discharge was achieved. Cycles when product was present in the container are also detectable. To achieve the latter it is necessary to detect that product was in the container during the cycle and it is preferred to monitor the current taken by the drive means. It is also known what position is taken up by the drive means because it moves at a constant speed and by measuring the time of operation the position of the plunger can be calculated. By measuring the drive current at, say, the mid point of movement the current value will determine if product is present because the current will be low in this condition if no product is present. Any current above the empty container current will signal product is present in the container and a dispensing cycle is taking place.

It will also be understood that the apparatus is not limited to containers dispensing a single portion. The container may have a capacity between a single portion and, say, one liter which may constitute several portions and the container may have one outlet or more than one.

When the apparatus is operated a selection may be made of portion size which may be determined according to the time over which the drive is operating in a dispensing mode.

If the container is already partially dispensed the dispensing time may be triggered where the current used by the drive means reaches the predetermined product dispensing level.

Over a dispensing operation the amount of product dispensed may vary over time due to the shape of the container and this may be programmed into the control system.

The apparatus controls may include portion size selection for the user, for example, different buttons for different sized portions. If the size of portion selected has not been reached at the point of container empty, a memory system permits the remaining selected portion to be dispensed from the next container.

If a container is partially full after dispensing it would normally be removed and placed in a tempering storage compartment until used again.

Other control features which may be included are programmed into electronic means so that the sequence may be as follows:— a) Dispenser switched on. Plunger moved to its uppermost, retracted position to register a datum from which other movements and timings are taken.

b) If the arm is in position but no container is present the operator is informed and advised to check the container. The arm can be lowered and no dispensing cycle can take place.

c) If the arm is in the upper fixed position and a container is present the dispensing control is illuminated and dispensing can take place. However the arm can be lowered to remove the container for the operator if required, for example, to change product type.

d) If the detection arrangement detects product to be too hard, the belleville springs are deflected and the associated switch operates to advise the operator. Since the same switch advises if the container is emptied the controls differentiate between the two conditions according to the time elapsed for movement of the plunger from the datum point.

e) A detection of container emptied by the belleville washer and switch arrangement causes a dispensing operation to cease and the plunger to return to its initial position.

f) The operation of the arm at the commencement and completion of a dispensing operation, as described, are detected and controlled by the programme. The arm is usually released as soon as the container is discharged of the selected product by a small retraction of the plunger followed by release of the arm. The plunger is, at this point, within the shroud and there is no danger to the operator even though the plunger is still moving upwards. The container can be replaced even when the plunger is moving upwards.

The apparatus can also be fitted with a voice board by which audible signals can be given to the operator during the course of operation to assist in operating the apparatus.

Usually, the apparatus will be constructed to be wall mounted but it can take other forms. For example it may be mounted on the front door of a container cabinet. It may be mounted on an upright stand on the back of a chest freezer cabinet with top access for the product. It may be mounted on a counter stand to form a counter dispenser.

The invention claimed is:

1. Apparatus for dispensing product from pre-filled containers comprising a product container having an outlet, a moveable portion of the container moveable to reduce the container volume and cause product to be extruded from the outlet, the container being locatable on a support, the apparatus further comprising drive means for engaging said moveable portion to effect discharge of product from container, and the drive means including detecting means for detecting whether product is dischargeable from the container, the drive means including a plunger engageable with a moveable portion of the container, the drive means extending between a fixed member and the container during use, and the detecting means detecting pressure applied by the plunger on the container, whereby, if said pressure exceeds a predetermined value, the drive means is operated to cease an operational drive movements wherein the detecting means comprises resilient means moveable upon a predetermined pressure being applied thereto and the detecting means being associated with switch means, whereby upon movement of the resilient means, the switch means is actuated to cause the drive means to cease operational movement thereof and wherein the resilient means comprises at least one Belville washer which contracts upon the application of a compressive force above a predetermined level, and extends when said force is reduced below said pre-determined level.

2. Apparatus according to claim 1 wherein the body of the drive means moves away from the container when said pre-determined pressure is reached.

3. Apparatus according to claim 1 wherein the predetermined pressure is selected to be that pressure which indicates that the product is too hard for extrusion through the outlet.

4. Apparatus according to claim 1 wherein the predetermined pressure is selected to be a pressure at which it is indicated that the container is substantially emptied, the moveable portion of the container having reached its lowest position.

5. Apparatus according to claim 1 wherein the resilient means is in the form of spring means arranged such that when the pressure applied thereto exceeds a predetermined level, the spring means contracts and permits the body of the drive means to move to actuate the switch means.

6. Apparatus according to claim 1 wherein the resilient means is arranged to be located between said fixed member and the body of the drive means, wherein when the drive means is in operation, the drive means is urged towards the fixed member and transmits said pressure to the resilient means, the fixed member providing an abutment against which the resilient means is urged by the drive means.

7. Apparatus for dispensing product from pre-filled containers which comprises a product container having an outlet, a moveable portion of the container moveable to reduce the container volume and cause product to be extruded from the outlet, the container being locatable on a support, the apparatus comprising drive means for engaging said moveable portion to effect discharge of product from the container, and detection means for detecting whether a container is present on the support, the detection means including a member which is movable to engage the container and thereby detect its presence of the support, said member being urged towards said support whereby to remain in a pre-determined position relative thereto during operation of the detection means, wherein the detection means is spring urged towards said support and the detection member extending moveably so that it is moved and actuated upon engagement with a container.

8. Apparatus for dispensing product from the pre-filled containers which comprises a product container having an outlet, a moveable portion of the container whereby to reduce the container volume and cause product to be extruded from the outlet, the container being locatable on a support, the apparatus further comprising drive means for engaging said moveable portion to effect discharge of product from the container, and the support being moveable between a charging position of the container and a container discharge position, locking means for securing the support in the discharge position, the locking means operating when it is detected that the support is in the discharge position and being released when discharge is complete, wherein the locking means include an electrically actuated bolt means, or a mechanically operated latching arrangement.

* * * * *